Aug. 16, 1927.
J. M. CUSTENBORDER
POWER TAKE-OFF DEVICE
Filed Aug. 3, 1925
1,639,630
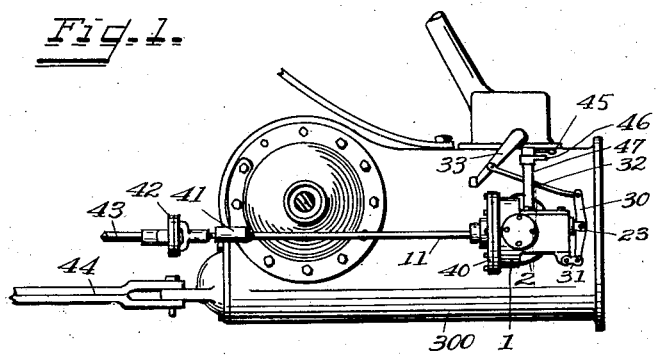
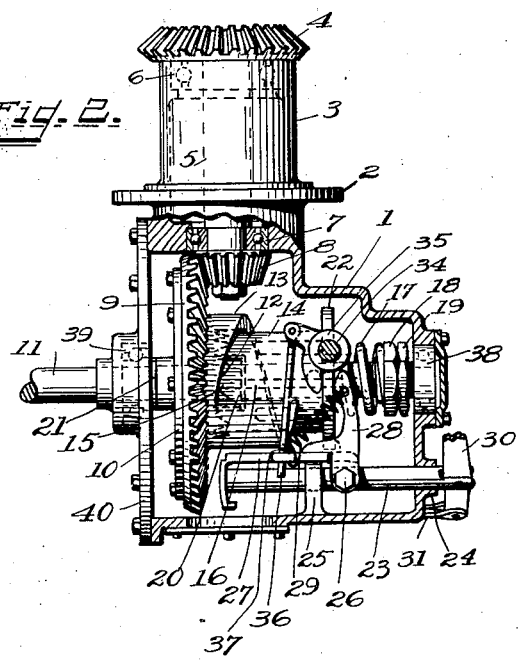
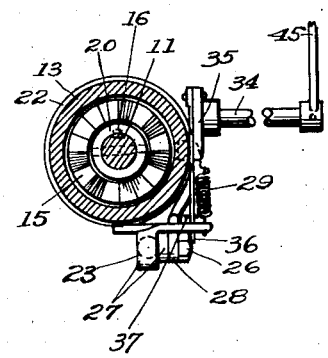
Inventor.
John M. Custenborder
Atty.

Patented Aug. 16, 1927.

1,639,630

UNITED STATES PATENT OFFICE.

JOHN M. CUSTENBORDER, OF MACKINAW, ILLINOIS, ASSIGNOR TO THE REVO MANUFACTURING CO., OF EAST PEORIA, ILLINOIS, A CORPORATION OF ILLINOIS.

POWER-TAKE-OFF DEVICE.

Application filed August 3, 1925. Serial No. 47,724.

My invention relates to devices for use in connection with tractors and trailing implements wherein the trailing implement is provided with mechanism which it is desired to operate from the power of the engine of the tractor. One example of such a trailing implement is a binder.

One object of my invention is to provide a device in the form of an attachment which may be readily mounted upon tractors such as the Fordson, and which will transmit the power of the engine directly to the mechanism of the binder or other trailing implements.

Another object of my invention is the provision of an over-load clutch whereby when the driving load becomes greater than the load at which the device is set, the over-load clutch will come into operation to relieve the mechanism of undue strains.

Another object of my invention is the provision of mechanism whereby, when the over-load clutch is called into play, the main clutch of the tractor is disengaged.

Another object of my invention is the provision of means for disengaging the over-load clutch without causing the disengagement of the main clutch of the tractor.

Other objects of my invention will be apparent from the specification.

The novelty of my invention will be hereinafter more fully set forth and specifically pointed out in the claims.

In the accompanying drawing:

Fig. 1 is a side elevation of the rear portion of a tractor such as the Fordson and showing my device attached in operative position.

Fig. 2 is a plan view partly in section of the device of Fig. 1.

Fig. 3 is a section end view of the portion of the mechanism of Fig. 2, the section being taken just to the right of the large bevel gear.

The same numerals of reference are used to indicate identical parts in all the figures.

As illustrating one form of device embodying my invention, though without limiting myself to the precise details of construction shown, or the arrangement of the parts, but availing myself of all changes and modifications which may be made without the scope of the appended claims, I have shown a housing 1 provided with a bolting flange 2 by means of which the device is attached to the tractor housing 300 at the place provided for the usual belt drive pulley. Projecting beyond the bolting flange 2 is a cylindrical portion 3, at the end of which a bevel gear 4 is mounted, this gear fastened to the shaft 5 which is mounted in anti-friction bearings 6 and 7. The gear 4 is positioned to mesh with a gear which is a part of the tractor mechanism and is ordinarily provided for the purpose of driving the belt pulley.

At the opposite end of the shaft 5 a bevel pinion 8 is mounted and this pinion meshes with and drives the ring-gear 9, the latter being mounted on a hub 10 which is mounted free to turn on the shaft 11. The hub 10 carries a series of angularly arranged projections 12 which form a part of the over-load clutch, and a spiral cam 13 which lies just outside of the projections 12.

A hub 14, which carries a series of projections 15 mating with the projections 12 is mounted on the shaft 11, free to slide thereon though connected to rotate the shaft by means of a feather key 16, and this hub is normally held against the hub 10 by means of a spring 17 which is adjustable by means of the nut 18 and lock nut 19. The hub 10 is confined on the shaft 11 between a collar 20 which is integral with the shaft and a second collar 21 which is preferably pinned to the shaft as shown more clearly in Fig. 3.

The hub 14 carries a flange 22 which performs several functions as will be described.

A rod 23 is mounted in the case 1 by means of bearings 24 and 25, and this rod carries a pivot pin 26 upon which a finger 27 and a trigger 28 are mounted, these two parts being connected together by an expansion spring 29. The lever 30 is carried by the end of the rod 23 and is connected at its lower end by links 31 to a lug on the case 1 and at its upper end by a link 32 to a clutch pedal 33 as shown in 31.

A vertical shaft 34 is mounted in the upper portion of the case 1 or in a cover therefor, and this shaft carries upon its lower end a bell crank 35, one arm of which lies adjacent the flange 22 of the hub 14, the other arm carrying a rod 36 which passes through an up-standing boss on the finger 27, the rod 36 carrying a pin 37, shown more clearly in Fig. 3.

The shaft 11 is mounted in an anti-friction bearing 38 mounted in the housing 1 and a second bearing 39 mounted in a head 40 which is attached to the housing 1, the shaft 11 extending rearwardly as shown more clearly in Fig. 1, and is supported by a bearing 41 suitably attached to the tractor, this shaft carrying at its rear end, a universal joint 42 by means of which the tumbling shaft 43, which extends to the trailing implement, is driven.

Any suitable draw-bar or tongue 44 serves as a means of moving the trailing implement forward as the tractor advances.

The upper end of the shaft 34 carries a hand lever 45 which may cooperate with a quadrant 46 mounted on the upper end of a tube 47 through which the shaft 34 passes, the tube and quadrant being shown in Fig. 1.

The operation of the device is as follows, assuming the parts all mounted and connected as shown in Fig. 1, and that the tumbling shaft 43 extends to a trailing implement of which the tongue 44 forms a part.

After having connected the parts, and upon proceeding to the field for operation, the operator moves the hand lever 45 to cause the hub 14 to slide along the shaft 11 and compress the spring 17 to disengage the projections 12 and 15 whereupon the gearing may all operate, though the shaft 11 will remain stationary.

After the shaft 34 is rotated as above described by the lever 45, the rod 36 is moved to bring the pin 37 against the finger 27 to hold this finger in the position in which it is shown in Figs. 2 and 3, the trigger 28 meanwhile being moved by the flange 22 and expanding the spring 29.

Upon arrival at the position for operation of the mechanism of the trailing implements, the hand lever 45 is released whereupon the spring 17 moves the hub 14 and projection 15 to move into engaged position with the projection 12 of the hub 10, in which position the parts are now as shown in Fig. 1 and connection is established between the ring-gear 9 and the shaft 11. If during the operation of the mechanism, an over-load condition should occur, such for instance as advancing the cutter bar of a binder to a point where the knives would strike a projecting root of a tree or any other obstruction, the increased load on the shaft 11 and the angular arrangement of the projections 12 and 15 would cause the hub 14 to slide along the shaft 11 and permit the projections to pass one another thus forming an over-load clutch. As the flange 22 moves back and forth along the shaft 11, the trigger 28 is moved to swing the finger 27 into the path of travel of the cam 13, and as soon as this cam reaches a position where the finger 27 can swing toward the shaft 11, the cam 13 comes in contact with the end of the finger 27 and moves the rod 23 in a direction away from the gear 9, thus moving the lever 30 and, through the link 32 disengaging the tractor clutch through the medium of the clutch pedal 33, thus stopping the forward movement of the tractor and the rotation of the gearing which drives the shaft 11.

After the obstruction has been removed, the operator depresses the clutch pedal 33 thereby still further moving the rod 23 and bringing the trigger 28 into contact with the housing 1 to restore the trigger 28 and the finger 27 to the position these parts occupy with relation to the rod 23 as shown in Fig. 2 whereupon the clutch pedal 33 may now be permitted to rise to cause the reengagement of the tractor clutch.

It will thus be seen that I have provided a device in which the power of the engine of the tractor may be employed to drive the mechanism of a trailing implement under conditions wherein an over-load clutch is provided to save the mechanism of the trailing implement under exceptional conditions and in addition that when these exceptional conditions occur and the over-load clutch is brought into operation, the main clutch of the tractor is disengaged to stop not only the application of the power of the engine to the mechanism of the tractor implements, but also to stop the advance of the tractor as well.

It is also to be noted that after the device has operated to disengage the main clutch of the tractor, all that is necessary for the operator to do to reset the mechanism is to fully depress the clutch pedal of the tractor and then permit it to resume its engaged position.

Having thus fully described my invention, I claim:

1. In a power take-off the combination of a housing arranged to be mounted on a tractor, a drive shaft in the housing and provided with a gear for engagement with a part of the tractor gearing behind the main clutch of the tractor, power take-off gearing driven by the shaft, a power take-off shaft driven by the latter gearing, an over-load clutch between the latter gearing and the power take-off shaft and means controlled by the over-load clutch for disengaging the tractor clutch when the power take-off shaft is over-loaded.

2. In a power take-off the combination of a housing arranged to be mounted on a tractor, a drive shaft mounted therein and provided with a gearing for engagement with a gear of the tractor, power take-off gearing driven by the shaft, a power take-off shaft driven by the latter gearing, an over-load clutch between the latter gearing and the power take-off shaft, a cam operated by the power take-off gearing, a member mounted to the moved into position to cooperate with the cam to disengage the main clutch of the tractor and means controlled by the movement of the over-load clutch for moving the latter member into engagement with the cam when the power take-off shaft is over-loaded.

3. In a power take-off the combination of a housing arranged to be mounted on a tractor, a drive shaft mounted in the housing and provided with gearing to engage the gearing of the tractor by the main clutch of the tractor, power take-off gearing in the housing and driven by the latter shaft, a power take-off shaft mounted in the housing, over-load clutch jaws carried by the power take-off gearing, and a yielding over-load clutch member mounted on the power take-off shaft and cooperating with the over-load clutch jaws of the gearing.

4. In a power take-off the combination of a housing arranged to be mounted on a tractor, a drive shaft mounted in the housing and provided with gearing to engage the gearing of the tractor by the main clutch of the tractor, power take-off gearing in the housing and driven by the latter shaft, a power take-off shaft mounted in the housing, over-load clutch jaws carried by the power take-off gearing, and a yielding over-load clutch member mounted on the power take-off shaft and cooperating with the over-load clutch jaws of the gearing and means for adjusting the over-load clutch to the load.

5. In a power take-off the combination of a power take-off shaft, a driving gear loosely mounted on the shaft, means for driving the driving gear from the gearing of a tractor back of the main clutch thereof, an over-load clutch between the power take-off shaft and its drive gear, connections between the driving gear and the main clutch of the tractor whereby when the over-load clutch operates to relieve an over-load the main clutch of the tractor is disengaged, and means for rendering these connections inoperative and for disengaging the over-load clutch.

JOHN M. CUSTENBORDER.